United States Patent [19]
Barényi

[11] 3,800,620
[45] Apr. 2, 1974

[54] STEERING WHEEL FOR MOTOR VEHICLES

[75] Inventor: Béla Barényi, Maichingen, Germany

[73] Assignee: Daimler-Benz AG

[22] Filed: June 12, 1972

[21] Appl. No.: 261,612

[30] Foreign Application Priority Data
June 12, 1971 Germany............................ 2129285

[52] U.S. Cl. ................................................. 74/552
[51] Int. Cl. ............................................... B62d 1/10
[58] Field of Search ....................................... 74/552

[56] References Cited
UNITED STATES PATENTS

| | | | |
|---|---|---|---|
| 1,915,769 | 6/1933 | Thomas | 74/552 |
| 1,638,044 | 8/1927 | Lee | 74/552 |
| 3,570,326 | 3/1971 | Albrecht et al. | 74/552 |
| 1,303,236 | 5/1919 | Benson | 74/552 |
| 1,411,239 | 3/1922 | Dover | 74/552 |
| 1,504,617 | 8/1924 | Geyer | 74/552 |
| 1,553,498 | 9/1925 | Beck | 74/552 |
| 2,872,539 | 2/1959 | Berner | 74/552 X |
| 3,483,770 | 12/1969 | Eibl et al. | 74/552 |
| 3,714,844 | 2/1973 | Tsuda | 74/552 |
| 3,540,304 | 11/1970 | Weiss | 74/552 X |

FOREIGN PATENTS OR APPLICATIONS

| | | | |
|---|---|---|---|
| 19,237 | 8/1913 | Great Britain | 74/552 |
| 1,188,980 | 4/1970 | Great Britain | 74/552 |

Primary Examiner—Benjamin W. Wyche
Assistant Examiner—F. D. Shoemaker
Attorney, Agent, or Firm—Craig & Antonelli

[57] ABSTRACT

A steering wheel for motor vehicles which includes a steering wheel rim connected by way of spokes with the steering wheel hub; the parts which form the steering wheel hub and the spokes are assembled from two sheet metal members; namely, a sheet metal bottom member and a sheet metal cover member that are connected shear-rigid with one another and form hollow bearers within the area of the spokes.

51 Claims, 17 Drawing Figures

STEERING WHEEL FOR MOTOR VEHICLES

The present invention relates to a steering wheel for motor vehicles which includes a steering wheel rim connected by way of spokes with the steering wheel hub that is adjoined in the direction toward a steering spindle by a deformation pot or the like.

Impact pots between the steering wheel and the steering spindle are used in order to prevent or at least reduce in case of an accident the injury danger of a person impinging on the steering wheel. The impact pots, which are capable of dissipating kinetic energy occurring during an accident by deformation work, considerably reduce the occurring loads and forces. Such impact pots which are constructed as deformation pots or other deformation members, however, must be able to withstand without deformation the forces occurring during the normal driving operation. Furthermore, for spatial reasons they can be installed only with a relatively small diameter. The steering wheels utilized customarily in conjunction with these impact pots do not possess a great rigidity or strength especially in the axial direction of the steering spindle so that in case of an accident, they are bent off or broken off and the driver impinges with the chest directly on the impact pot or the projecting hub portion. Even though the forces occurring thereby are frequently considerably reduced, they are frequently still so high by reason of the small area that they lead to considerable injuries of the driver. In order to avoid this disadvantage, it is appropriate if a steering wheel, which is as inherently rigid and stiff a steering wheel as possible, is used which can then distribute the occurring forces to the chest of the driver over a relatively large area far reachingly uniformly. However, the hitherto customary steering wheel constructions permit a reinforcement or stiffening only by a considerable increase of the weight of the steering wheel which, however, is not desirable in practice. The mass of a heavy steering wheel would be excited into considerable oscillations by the vehicle vibrations which, apart from the considerable decrease of the driving comfort, would lead to the danger that the steering and particularly its mounting could be considerably damaged already after a relatively short operating period.

Until the most recent times, attempts were made to create steering devices satisfactory from a safety point of view by a hydraulically damped steering column, on the one hand, and by a fully elastic steering wheel, for example, made of rubber, on the other. Both of these approaches, however, have proved fallacious in the meantime. The most recent known constructions which also re-appear every so often in patents, exhibit several details particularly contrary to safety, which relate to the construction and configuration of the steering wheel rim, of the spokes, and of the hub.

Until very recently, steering wheel rims of brittle and splintering material, for example, of wood, always have been proposed again. However, a high injury danger results therefrom. Additionally, allegedly very safe steering wheel rims made of particularly elastic material are offered in the advertising materials. Though such types of steering wheel rims are themselves not cause for injuries, they are also unable to protect the driver against impact onto parts disposed therebehind which are then the cause for injuries.

Contrary to safety is also the use of spokes that are yielding in bending or weak in bending, for example, spokes with filigree cross section, spokes of horizontally arranged band material, spokes with large apertures, spokes of unsuited material, for example, aluminum, or spokes which are characterized by particular lengths or sharp-edged profiles. These spokes are either directly the cause of injuries or at least offer no protection against impingement onto parts disposed therebehind. To the same result leads a proposal to construct the spokes which as such cannot be sufficiently short, of excessive length.

Unfavorable is also the use of torsionally yielding spokes or spoke systems which are created by inappropriate technology, i.e., material selection, or by an inappropriate arrangement, for example, only two spokes extending approximately horizontally through the steering wheel.

The hub arrangement is also frequently inappropriate. The combination of a spoke system yielding in bending and/or yielding in torsion with a spike-like hub projecting beyond the spoke plane should be mentioned in that connection. Hubs having a spiking effect and with a minimum impact surface are repeatedly proposed again from time to time whereby the view is taken that the spearing effect is eliminated by the choice of rubber instead of steel. However, this involves one of the most disastrous, erroneous conclusions.

The injury consequences, owing to incompletely thought-through steering wheel arrangements, can be reduced only in part by an impact pot. In that connection, it should be pointed out in particular that accident research still considers even to date the so-called impact force as the sole criterion. However, other criteria thereby play frequently considerable roles, such as, for example, humps or even points which remain or form at the deforming spokes or steering wheel rims.

The present invention is concerned with the task for the purpose of increasing the internal safety of a motor vehicle, to so construct a steering wheel of the aforementioned type that it is far-reachingly rigid whereas its weight can be kept relatively small. The present invention essentially consists in that the part forming the steering wheel hub and the spokes is composed of two sheet metal members, a sheet metal bottom member and a sheet metal cover member, which are connected with each other with high shearing strength and which form hollow bearers within the area of the spokes. Such a steering wheel is far-reachingly rigid whereas it possesses nonetheless a relatively slight weight.

In order to enable a saving in weight without reducing the spokes in the rigidity thereof, provision is made in one embodiment of the present invention that the spokes taper outwardly in the radial direction. Hollow bearers of equal uniform strength or rigidity are thereby created for the spokes with respect to the steering wheel center.

In one advantageous embodiment of the present invention, three spokes arranged at angular distances of 120° are provided whereby the arcuately shaped curved flanks of the adjacent spokes merge into one another. A steering wheel with a relatively large surface is produced by this construction without impairing the holding and handling ability of the steering wheel rim and without reducing the visibility conditions.

In one structurally advantageous embodiment, the sheet metal cover member surrounds the sheet metal bottom member within the area of the spokes by means of a hat-shaped profile. The two sheet metal members may be connected with each other non-detachably and absolutely rigid in shear by additional welding, spot-welding and/or beading over.

In another embodiment of the present invention, provision is made that the sheet metal cover member and the sheet metal bottom member are constructed as outwardly curved or convex shells. This construction produces a steering wheel that provides an inherently very rigid hollow body which is approximately lens-shaped in cross section within the area of the spokes.

In order to simplify the assembly of the steering wheel and of the deformation pot or the like, according to a further feature of the present invention, the sheet metal bottom member is made in one piece with the deformation pot or the like.

For the further increase of the safety of the driver, in one embodiment of the present invention, a deformation body directed toward the vehicle interior space is arranged on the sheet metal cover member in the steering wheel center.

In order to create as rigid as possible a connection to the steering wheel rim, in a further embodiment of the present invention the sheet metal bottom member and/or the sheet metal cover member include a rim enclosing at least the spokes, which surrounds the core of the steering wheel rim that consists of wire or pipe.

For purposes of further increasing the accident protection of the driver, provision is made in still another embodiment of the present invention that the part of the steering wheel disposed on the side of the steering wheel rim, in particular the spokes thereof are covered with foamed material.

Accordingly, it is an object of the present invention to provide a steering wheel for motor vehicles which avoids by simple means the aforementioned shortcomings and drawbacks encountered in the prior art.

Another object of the present invention resides in a steering wheel for motor vehicles which is completely satisfactory as regards transmission of forces during normal operation, yet greatly increases the safety and protection of the driver against impact accidents.

A futher object of the present invention resides in a steering wheel in which the specific forces are reduced in case of an impact of the chest of the driver against the steering wheel by the presence of a relatively large impact area.

A still further object of the present invention resides in a steering wheel which achieves all of the aforementioned aims and objects without requiring an increase in the mass and weight thereof.

Still a further object of the present invention resides in a steering wheel which offers protection against injury when the driver's body impinges thereagainst, particularly with respect to the parts of the steering system disposed underneath the steering wheel.

Another object of the present invention resides in a steering wheel which can be manufactured in a simple and economical manner and which can be installed by simple means.

These and further objects, features and advantages of the present invention will become more apparent from the following description when taken in connection with the accompanying drawing which shows, for purposes of illustration only, several embodiments in accordance with the present invention and wherein:

Figure 7:
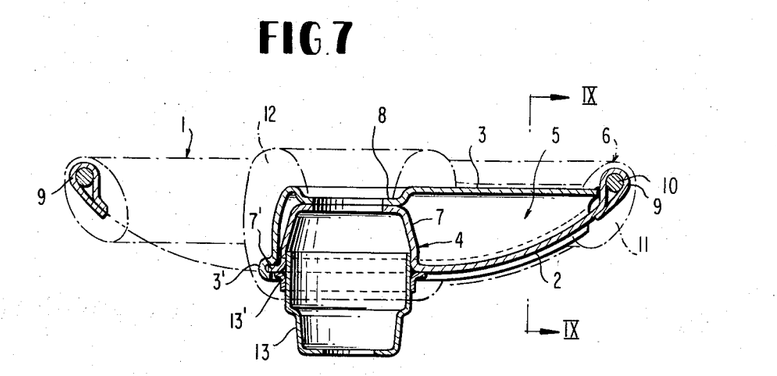
FIG. 7 is a cross-sectional view through a steering wheel in accordance with the present invention assembled from the parts illustrated in FIGS. 1 and 3, and taken along line VII—VII of FIG. 8.
Figures 8, 9:
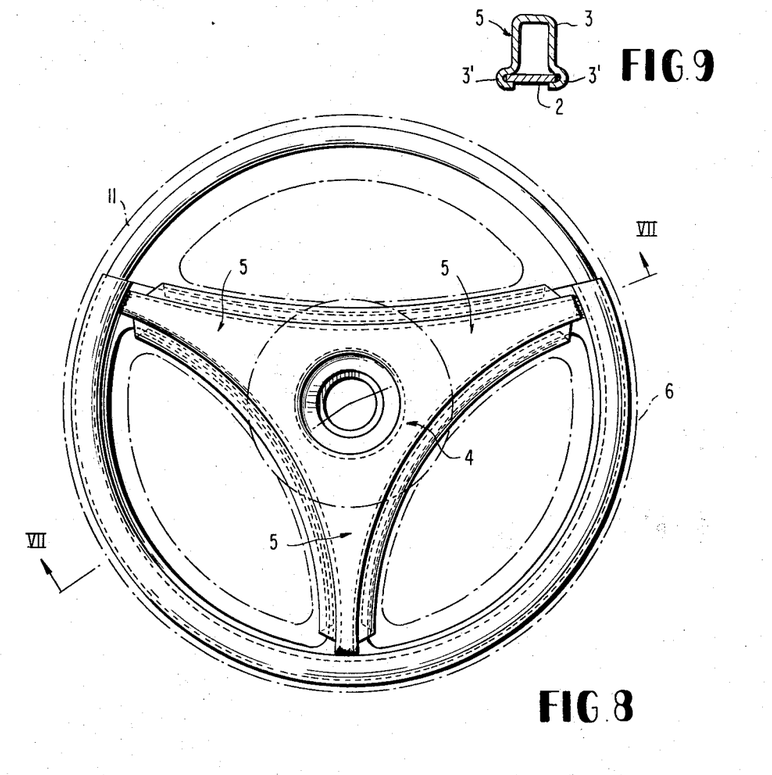
FIG. 8 is a top plan view of the assembled steering wheel of FIG. 7.
FIG. 9 is a cross-sectional view taken along line IX—IX of FIG. 7.

Referring now to the drawing wherein like reference numerals are used throughout the various views to designate like parts, the steering wheel generally designated by reference numeral 1 and illustrated in FIGS. 7 and 8 in the assembled condition, essentially consists of two sheet metal members illustrated in detail in FIGS. 1 to 6, namely, of a sheet metal bottom member 2 (FIGS. 1 and 2) and of a sheet metal cover member 3 (FIGS. 3 – 6). The sheet metal bottom member 2 and the sheet metal cover member 3 form both the hub generally designated by reference numeral 4 (FIGS. 7 and 8) as also the spokes generally designated by reference numeral 5 (FIGS. 7 and 8) of the steering wheel 1 which are connected radially outwardly with a steering wheel rim generally designated by reference numeral 6. The bottom member 2 and the cover member 3 are constructed essentially starshaped whereby three spokes 5 arranged at angular distances of 120° are formed. In the center, the sheet metal bottom member 2 and the sheet metal cover member 3 are provided with embossments or indentations 7 and 8 directed toward one another whose central surfaces abut against one another. Within the area of the spokes 5, the arms of the star-shaped part of the sheet metal bottom member 2 are constituted as non-profiled sheet metal strips which rise from the embossment 7 with a curvature up to the steering wheel rim 6. The arms of the star-shaped sheet metal cover member 3 are constructed as hat-shaped profile, as illustrated in particular in FIG. 9. Their height is matched to the arcuate curvature of the strip-shaped arms of the bottom member 2 so that hollow bearers are formed for the spokes 5 whose cross section decreases from the hub 4 toward the steering wheel rim 6, and the spokes 5 are constructed as bearers or supports of equal uniform rigidity or strength in relation to the hub 4 and capable of resisting substantial bending forces and bending stresses.

Figure 1:
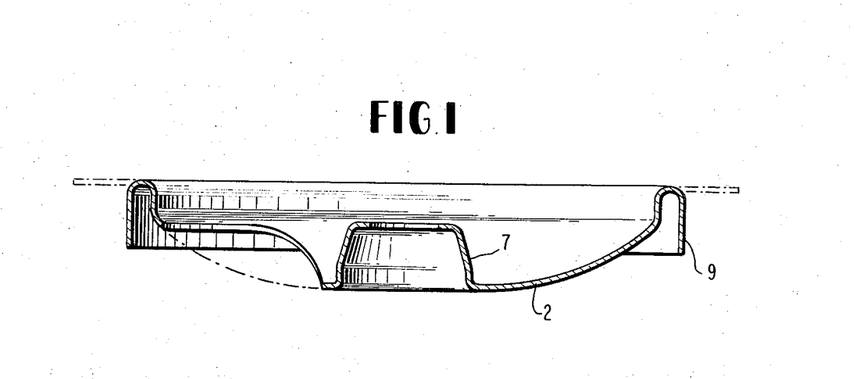
FIG. 1 is a cross-sectional view, taken along line I—I of FIG. 2, through a part of a steering wheel according to the present invention constituting the bottom member thereof.
Figure 2:
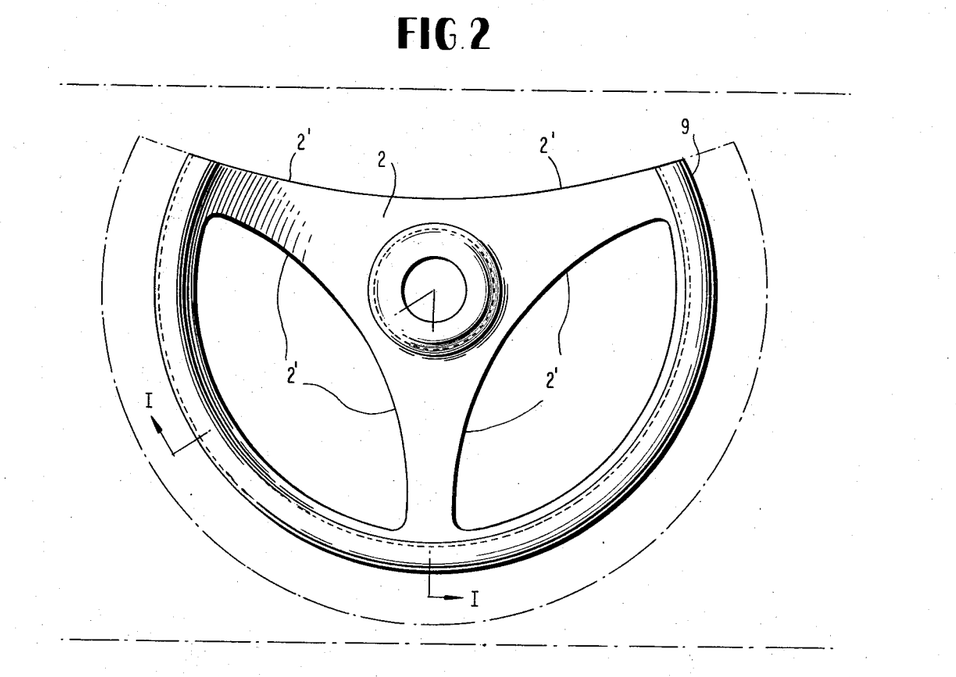
FIG. 2 is a top plan view of the bottom part of the steering wheel according to the present invention as illustrated in FIG. 2.
Figure 3:
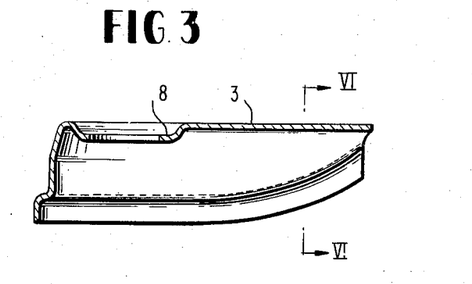
FIG. 3 is a partial cross-sectional view through another part of a steering wheel in accordance with the present invention, constituting the cover member thereof and taken along line III—III of FIG. 4.
Figure 4:
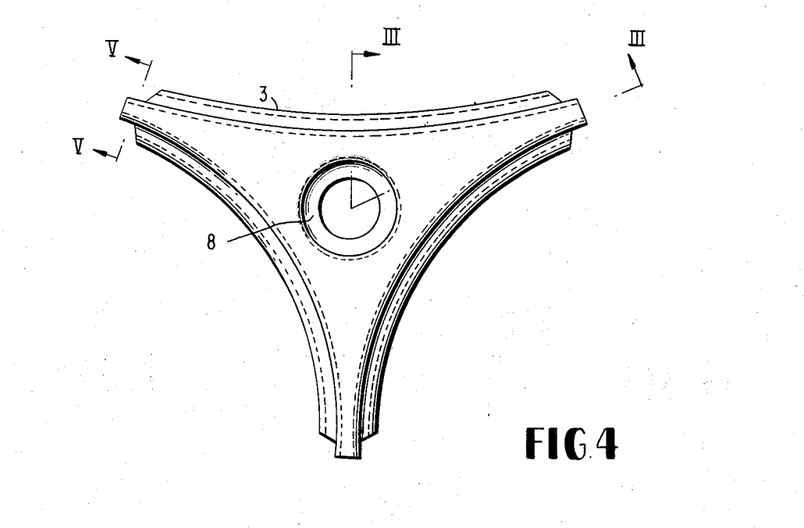
FIG. 4 is a top plan view of the cover part of the steering wheel in accordance with the present invention illustrated in FIG. 3.
Figure 5:
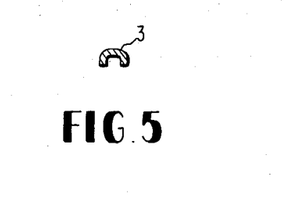
FIG. 5 is a cross-sectional view taken along line V—V of FIG. 4.
Figure 6:
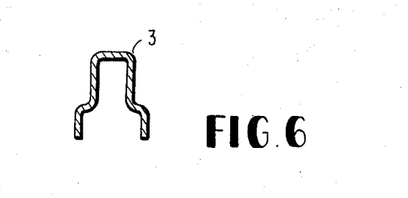
FIG. 6 is a cross-sectional view, taken along line VI—VI of FIG. 3.

As can be seen in particular from FIGS. 2 and 8, the flanks 2' (FIG. 2) of the spokes 5 are constituted of arcuate shape. They respectively pass over or merge smoothly into the flanks of the adjacent bearer. The rim of the sheet metal cover member 3 is, as shwon in FIGS. 7 and 9, folded, flanged or beaded over the sheet metal bottom member 2 at the places indicated by 3'. In order to obtain an absolutely shear-resistant connection of the sheet metal bottom member 2 and of the sheet metal cover member 3, additional spot-welded connections or the like can be realized within the area of the beading over.

The sheet metal bottom member 2 includes a rim 9 (FIGS. 1 and 2) enclosing outwardly the part forming the bottom of the spokes 5, which rim 9 occupies approximately two-thirds of the circumference of the steering wheel rim 6 (FIG. 7) and terminates at the upper spokes 5 which are disposed approximately horizontally in the normal position of the steering wheel, i.e., when the vehicle drives straight. The rim 9 (FIG. 2) is thus a component of the steering wheel rim 6, for which purpose it is folded or beaded over about a core 10 consisting of a cable or the like. It is thereby advantageous if the upper third of the steering wheel rim 6 is not constructed as rigid as the remaining part of the steering wheel 1 since under certain circumstances, the head of the driver may inpinge thereagainst in case of an accident. The steering wheel rim 6 is completed by a sheathing or casing 11 indicated in dash and dot line which is made from any known synthetic plastic material and has an oval cross section. Additionally, a padding 12 (FIG. 7) made from conventional foamed material or the like, which is also indicated in dash and dot lines, may be provided in the central area, i.e., within the area of the steering wheel hub 4.

A deformation pot 13 (FIG. 7) adjoins the steering wheel hub 4, which in this embodiment is centered on the inside of the indentation 7 of the sheet metal bottom member 2. A continuous peripherally extending flange 13' is secured at the deformation pot 13, which flange, in its turn, is secured at the rim 7' of the indentation 7, for example, by welding.

Figures 10, 11, 15, 16, 17:
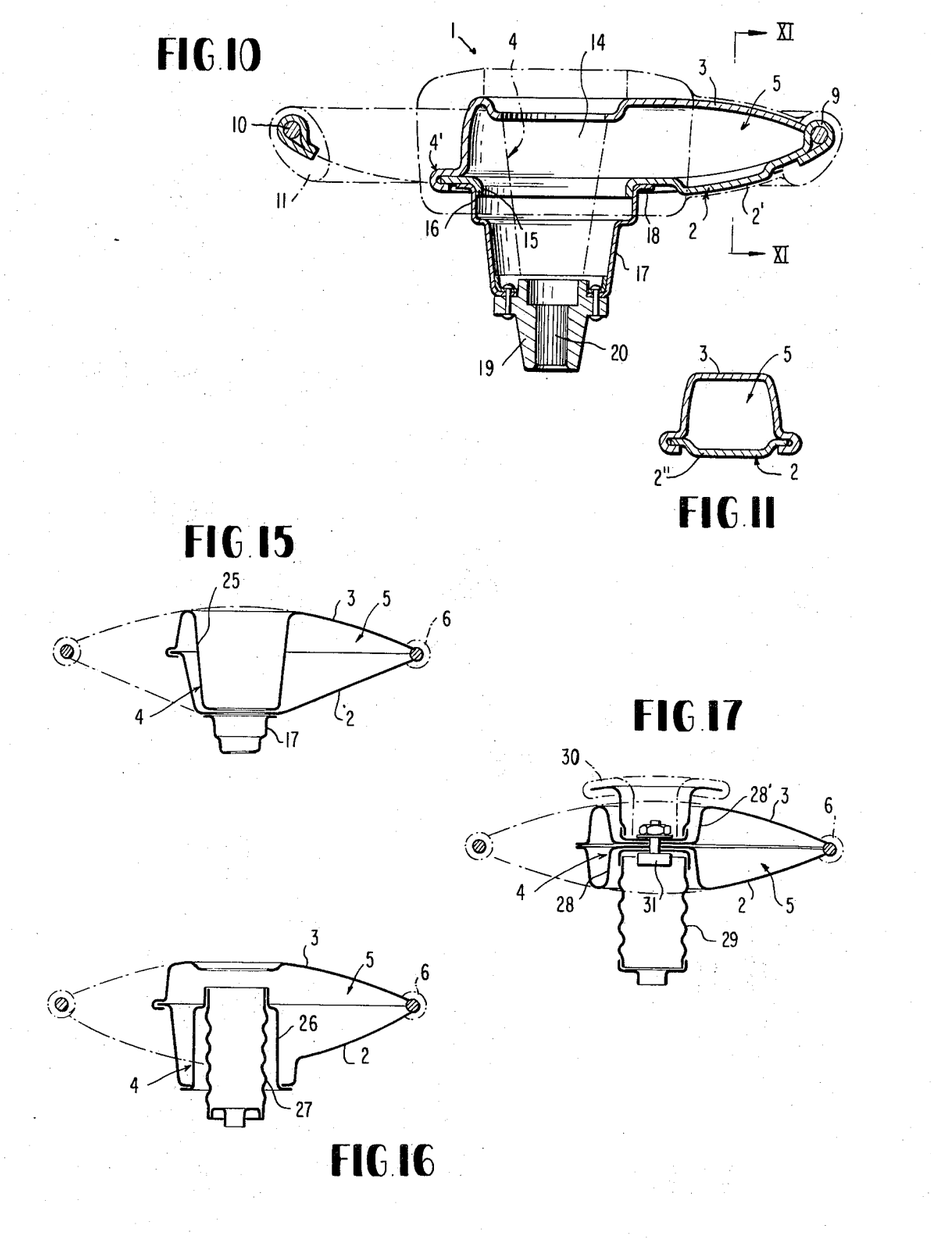
FIG. 10 is a cross-sectional view, similar to FIG. 7, through a further embodiment of a steering wheel in accordance with the present invention.
FIG. 11 is a cross-sectional view, taken along line XI—XI of FIG. 10.
FIGS. 15 through 17 are schematic cross-sectional views through three still further embodiments of steering wheels in accordance with the present invention.

The steering wheel 1 illustrated in FIG. 10 also consists of a sheet metal bottom member 2 and of a sheet metal cover member 3 which are constructed essentially star-shaped in a manner corresponding to the embodiment according to FIG. 7. In this embodiment, a connection of the two sheet metal parts 2 and 3 within the area of the steering wheel hub 4 is dispensed with so that only a circumferentially extending folded-over or beaded over connection generally designated by reference numeral 4' exists between the same which is completed in that the edges of the star-shaped arms are welded to the rim 9 of the bottom member 2 as in the embodiment according to FIGS. 7 and 8. However, in the embodiment according to FIG. 10, a considerable reinforcement is achieved in the spokes 5 constructed as hollow bearer and the central part forming the hub 4 are foamed out with a hard foamed material of any known type except for a central, approximately funnel-shaped aperture 14 (FIG. 10). In this embodiment, the star-shaped arms of the cover member 3 are also outwardly curved, i.e., are also convex, so that within the area of the spokes 5 an approximately lens-shaped cross section exists. Additionally, the sheet metal strips of the bottom member forming the bottom of the spokes 5 are provided with profile means in the form of embossments 2" which increases the cross section and rigidity.

The central portion of the sheet metal bottom member 2 is provided with an aperture 15 that is delimited by an edge 16 angularly bent off in the downward direction. A step-shaped deformation pot 17 is centered externally at this edge 16 which is secured with a flange 18 thereof at the bottom member 2. A cone member 19 adapted to be connected with the steering spindle (not shown) is riveted to the lower end of the deformation pot 17; the cone member 19 is threadably secured to the steering spindle by way of a central bore 20 whereby the central bore 20 remains accessible by way of the central aperture 14 of the steering wheel 1. The aperture 14 can be filled after the assembly of the steering wheel by foamed material body or the like indicated in FIG. 10 is dash and dot lines, which represents a further injury protection.

Figures 12, 14:
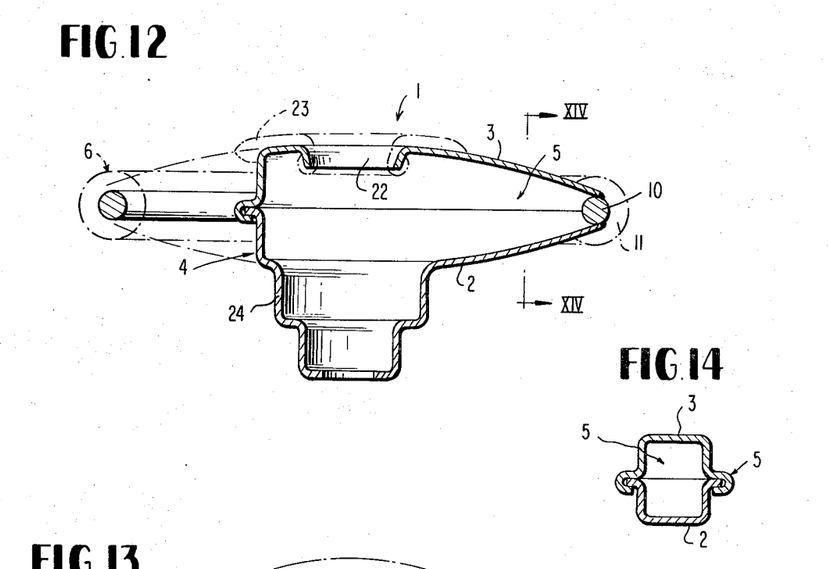
FIG. 12 is a cross-sectional view, similar to FIGS. 7 and 10, of still another modified embodiment of a steering wheel in accordance with the present invention, and taken along line XII—XII of FIG. 13.
FIG. 14 is a cross-sectional view taken along line XIV—XIV of FIG. 12.
Figure 13:
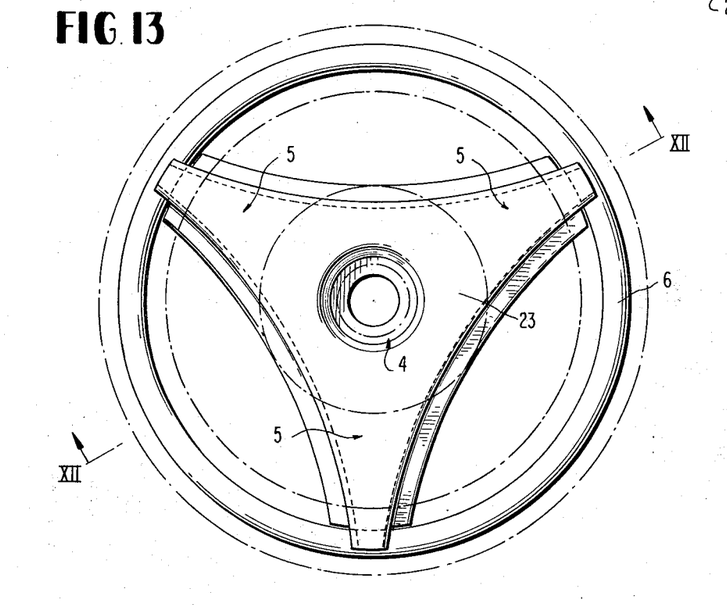
FIG. 13 is a top plan view of the steering wheel according to FIG. 12.

In the embodiment of the present invention illustrated in FIGS. 12 to 14, a sheet metal bottom member 2 and a sheet metal cover member 3 are utilized which are constructed essentially as outwardly or convexly curved shells and are connected with each other in a plane separating surface that is disposed at the height of the center plane of the steering wheel rim 6. The arms of the star-shaped bottom member 2 and of the also star-shaped cover member 3 which form the spokes 5, are constructed each as hat-shaped profiles (FIG. 14) which are connected with each other in the common separating surface by a folded-over or beaded-over connection 5', as illustrated in particular in FIG. 14. These beaded connections 5' may additionally be reinforced by spot-welding or the like. Also in this embodiment, the spokes 5 are constructed as bearers with equal uniform rigidity as regards the steering wheel center. The ends of the star-shaped sheet metal members 2 and 3 are welded at the top and at the bottom to a ring 10 serving as core of the steering wheel rim 6 and made of a tubular member or wire. This ring 10 is enclosed by a synthetic plastic sheathing or casing 11. The cover member 3 is provided with a central aperture 22 (FIG. 12) into which is inserted from above a padding 23 of synthetic plastic material or the like which is open in the center.

The bottom member 2 is constructed in this embodiment in one piece with a deformation pot 24, for which purpose its central area is embossed several times step-shaped in the downward direction.

The embodiment of the present invention schematically illustrated in FIG. 15 consists also of a star-shaped sheet metal bottom member 2 and a star-shaped sheet metal cover member 3 which are both constructed as shells and possess a plane separating surface extending at the height of the steering wheel rim 6. The sheet metal cover member 3 is curved outwardly within the area of the spokes 5, i.e., convexly whereas the sheet metal bottom member 2 rises from a lower deformation pot 17 rectilinearly toward the steering wheel 6 within the area of the spokes 5. The cover member 3 is provided within its central area with an indentation or embossment 25 which is drawn down to the bottom of the bottom member 2 and which assists in supporting the deformation pot 17.

The embodiment of the present invention according to FIG. 16, also only schematically illustrated, corresponds in its basic construction to the embodiment according to FIGS. 12 to 14. However, the sheet metal bottom member 2 is not constructed in one piece with a deformation pot but instead is provided with an inwardly directed spacer tube 26. This spacer tube 26 accommodates at its free inwardly disposed end the upper rim of a deformation member 27 whereby these connecting places are disposed approximately in the plane of the steering wheel rim 6.

In the embodiment of the present invention according to FIG. 17, again only schematically illustrated, the steering wheel is assembled of two axially symmetrically constructed sheet metal parts 2 and 3. The star-shaped sheet metal bottom member 2 and the similarly star-shaped sheet metal cover member 3 are constructed as hat-shaped profiles within the area of the arms forming the spokes 5 thereof, whose curved portions extend arcuately toward the steering wheel rim 6 disposed in the central separating plane. Also, in this embodiment, the spokes 5 are constructed as bearers with equal uniform rigidity in relation to the steering wheel center. The bottom member 2 and the cover member 3 are provided in the steering wheel center with inwardly directed indentations or embossments 28 and 28' whose bottoms abut against one another. The bottom member 2 accommodates in this embossment 28 the upper end of a deformation pot 29 whose other end is connected with the steering spindle (not shown) by conventioanl means A further deformation body 30 is provided on the outside which is accommodated by the embossment 28' of the cover member 3, and which projects radially outwardly above the spokes 5 of the steering wheel. Both deformation bodies 29 and 30 are retained by a common bolt 31 and ring nut on the inside of the embossments 28 and 28'.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modification as are encompassed by the scope of the appended claims.

What I claim is:

1. A steering wheel for motor vehicles comprising: a steering wheel hub, a steering wheel rim means, spoke means for connecting said steering wheel rim means with said steering wheel hub, a deformation means adjoining said steering wheel hub, said steering wheel hub and said spoke means consist of a bottom member and a cover member connected with each other in a shear-rigid manner, said bottom member and said cover member forming hollow bearers within the area of the spoke means, said spoke means being substantially U-shaped opening toward said bottom member and having a height in the axial direction of the steering wheel hub decreasing in the direction to-ward the steering wheel rim means.

2. A steering wheel according to claim 1, wherein said bottom member and said cover member are sheet-metal stampings.

3. A steering wheel according to claim 1, wherein said spoke means taper in the radial direction toward the outside.

4. A steering wheel according to claim 1, wherein three spoke means are provided having flank portions of arcuate shape with the flank portions of adjacent spoke means passing over one into the other.

5. A steering wheel according to claim 4, wherein said three spoke means are provided at an angular distance of about 120°.

6. A steering wheel according to claim 5, wherein said cover member and said bottom member are constructed as convexly curved shell members.

7. A steering wheel according to claim 6, wherein a plane separating surface is provided between the two shell members.

8. A steering wheel according to claim 7, wherein said two shell members are constructed substantially symmetrically about the separating plane thereof.

9. A steering wheel according to claim 8, wherein said bottom member and said cover member are provided within the central area thereof with indentations directed toward one another, said indentations being rigidly connected with each other.

10. A steering wheel according to claim 5, wherein said bottom member includes an indentation means for centering the adjoining deformation means.

11. A steering wheel according to claim 10, wherein said deformation means is a deformation pot.

12. A steering wheel according to claim 5, wherein said cover means is provided with indentations and said deformation means is connected to the steering wheel within the area of said indentation means of said bottom member, said indentation means of said bottom member and said indentation of said cover member being connected with each other.

13. A steering wheel according to claim 5, wherein an outwardly projecting spacer tube is mounted at said bottom member in the steering wheel center.

14. A steering wheel according to claim 5, characterized in that the connecting places of said deformation means secured at least at said bottom member are disposed in the plane of said steering wheel rim means.

15. A steering wheel according to claim 5, wherein said bottom member is made in one piece with the deformation means.

16. A steering wheel according to claim 5, wherein a further deformation means is provided on said cover member in the steering wheel center directed toward the vehicle interior space.

17. A steering wheel according to claim 5, wherein said steering wheel rim means includes a core, at least one of said bottom member and said cover member includes a rim portion including at least the spoke means which surrounds said core.

18. A steering wheel according to claim 17, wherein said core consists of at least one of a wire or a tubular member.

19. A steering wheel according to claim 17, wherein said rim portion is beaded-over said core of the steering wheel rim means.

20. A steering wheel according to claim 5, wherein the part of the steering wheel disposed inside the steering wheel rim means is covered off with foamed material.

21. A steering wheel according to claim 5, wherein said spoke means are covered off with foamed material.

22. A steering wheel according to claim 21, wherein said foamed material is detachably secured at said spoke means.

23. A steering wheel according to claim 22, wherein said foamed material consists of several layers of different yieldingness.

24. A steering wheel according to claim 23, wherein said foamed material consists of several layers of differing damping characteristics.

25. A steering wheel according to claim 5, wherein said hollow body constituted by said bottom member and said cover member is at least partially foamed out with foamed material.

26. A steering wheel according to claim 25, wherein the hollow body constituted by said bottom member and said cover member is completely foamed out with foamed material.

27. A steering wheel according to claim 5, wherein said bottom member and said cover member, in the assembled condition, form a central steering wheel portion of substantially equal uniform rigidity in relation to the central part thereof.

28. A steering wheel according to claim 1, wherein said cover member and said bottom member are constructed as convexly curved shell members.

29. A steering wheel according to claim 28, wherein a plane separating surface is provided between said two shell members.

30. A steering wheel according to claim 29, wherein said two shell members are constructed substantially symmetrically about the separating plane thereof.

31. A steering wheel according to claim 1, wherein said bottom member and said cover member are provided within the central area thereof with indentations directed toward one another, said indentations being rigidly connected with each other.

32. A steering wheel according to claim 31, wherein said bottom member includes an indentation means for centering the adjoining deformation means.

33. A steering wheel according to claim 31, wherein said deformation means is a deformation pot.

34. A steering wheel according to claim 31, wherein said cover member is provided with indentations and said deformation means is connected to said steering wheel within the area of said indentation means of the bottom member, said indentation means of said bottom member and said indentations of the cover member being connected with each other.

35. A steering wheel according to claim 1, wherein an outwardly projecting spacer tube is mounted at said bottom member in the steering wheel center.

36. A steering wheel according to claim 1, wherein connecting places of said deformation means secured at least at said bottom member are disposed in the plane of said steering wheel rim means.

37. A steering wheel according to claim 1, wherein said bottom member is made in one piece with said deformation means.

38. A steering wheel according to claim 1, wherein an additional deformation means is provided on said cover member in the steering wheel center directed toward the vehicle interior space.

39. A steering wheel according to claim 1, wherein said steering wheel rim means includes a core, and wherein at least one of said bottom member and said cover member includes a rim portion including at least the spoke means which surrounds said core.

40. A steering wheel according to claim 39, wherein said rim portion is beaded-over said core of said steering wheel rim means.

41. A steering wheel according to claim 1, wherein the part of the steering wheel disposed inside the steering wheel rim means is covered off with foamed material.

42. A steering wheel according to claim 1, wherein said spoke means are covered off with foamed material.

43. A steering wheel according to claim 42, wherein said foamed material is detachably secured at the spoke means.

44. A steering wheel according to claim 42 wherein said foamed material consists of several layers of different yieldingness.

45. A steering wheel according to claim 44, wherein said foamed material consists of several layers of differing damping characteristics.

46. A steering wheel according to claim 1, wherein the hollow body constituted by said bottom member and said cover member is at least partially foamed out with foamed material.

47. A steering wheel according to claim 46, wherein the hollow body constituted by said bottom member and said cover member is completely foamed out with foamed material.

48. A steering wheel according to claim 1, wherein said bottom member and said cover member, in the assembled condition, form a central steering wheel portion of substantially equal uniform rigidity in relation to the central part thereof.

49. A steering wheel according to claim 1, wherein said substantially U-shaped spoke means includes a central portion, a first pair of spaced leg portions disposed on respective sides of said central portion, a second pair of leg portions spaced at a greater distance than the spacing between the leg portions of said first pair of spaced leg portions, and an angularly bent portion connecting the respective leg portions of said first pair of spaced leg portions with a corresponding leg portion of said second pair of leg portions.

50. A steering wheel according to claim 1, wherein said substantially U-shaped spoke means includes a central portion, a pair of spaced leg portions disposed on respective sides of said central portion, each of the free ends of said leg portions being provided with a beaded portion for engaging said bottom cover member.

51. A steering wheel according to claim 1, wherein said substantially U-shaped spoke means includes a central portion, a pair of spaced leg portions disposed on respective sides of said central portion, each of the free ends of said leg portions being provided with a beaded portion, and wherein said bottom member includes a central portion disposed substantially parallel to said central portion of said spoke means and spaced therefrom, a pair of spaced leg portions disposed on respective sides of said central portion of said bottom member, the free ends of the leg portions of said bottom member being provided with bent-off portions receivable in said beaded portions provided on the leg portions of said spoke means.

* * * * *